(12) United States Patent
Dudley

(10) Patent No.: US 6,431,225 B1
(45) Date of Patent: Aug. 13, 2002

(54) METHODS AND APPARATUS FOR REPAIR OF FLAT TIRES

(75) Inventor: Newton Howard Dudley, Blum, TX (US)

(73) Assignee: Technical Chemical Company, Cleburne, TX (US)

( * ) Notice: Subject to any disclaimer, the term of this patent is extended or adjusted under 35 U.S.C. 154(b) by 0 days.

(21) Appl. No.: 10/001,771

(22) Filed: Oct. 23, 2001

(51) Int. Cl.⁷ .................................................. B65B 1/04
(52) U.S. Cl. ............................. 141/38; 141/67; 152/415
(58) Field of Search ............................. 141/38, 100, 9, 141/67; 152/415, 416; 301/5.24

(56) References Cited

U.S. PATENT DOCUMENTS

| | | | | |
|---|---|---|---|---|
| 2,991,629 A | * | 7/1961 | Rose | 137/209 |
| 4,653,550 A | * | 3/1987 | Crowley | 137/223 |
| 4,765,367 A | * | 8/1988 | Scott | 137/597 |
| 4,941,600 A | | 7/1990 | Berriochoa et al. | |
| 5,070,917 A | * | 12/1991 | Ferris et al. | 141/38 |
| 6,019,145 A | * | 2/2000 | Savidge | 141/100 |

\* cited by examiner

Primary Examiner—Steven O. Douglas
(74) Attorney, Agent, or Firm—Marlin R. Smith, Esq.; J. Richard Konneker, Esq.; Konneker & Smith, P.C.

(57) ABSTRACT

Methods and systems for dispensing a product from a container into a tire are provided. In a described embodiment, a method of dispensing a product into a tire inflation port includes the steps of attaching a flexible conduit to the inflation port and then operatively attaching the conduit to container of the product. A system for dispensing a product into an inflation port of a tire includes: a container having the product pressurized therein, and a valve selectively permitting and preventing flow of the product from the container; and a conduit assembly including a flexible conduit extending between a container connector and a port connector, the container connector being configured for connection to the container for flow of the product from the container into the conduit, and the port connector being configured for connection to the inflation port for flow of the product from the conduit into the tire.

16 Claims, 4 Drawing Sheets

METHODS AND APPARATUS FOR REPAIR OF FLAT TIRES

BACKGROUND

The present invention relates generally to systems and methods for dispensing a product from a container into a tire and, in an embodiment described herein, more particularly provides methods and apparatus for repair of flat tires.

It is well known in the art to repair a flat tire by flowing a sealant into the tire. The sealant at least temporarily seals whatever puncture or other leak that caused the tire to lose pressure. To permit driving on the tire after the leak has been sealed, it is common to package the sealant with a pressurized gas (which may be in liquid form when sufficiently pressurized), so that the tire is inflated somewhat after the leak is sealed.

There exists a need to provide a convenient method and system for dispensing the sealant, gas and/or other product from a container into a tire. Present methods and systems have drawbacks, which are discussed more fully below.

SUMMARY

In carrying out the principles of the present invention, in accordance with an embodiment thereof, a method is provided which improves on present techniques of dispensing a product into a tire. A system is also provided for use in the method.

In one aspect of the invention, a method of dispensing a product into a tire includes the steps of attaching a flexible conduit to a tire inflation port and then attaching the conduit to a container of the product. By first attaching the conduit to the inflation port, the difficulties of attaching the container to the port are eliminated. Attachment of the conduit to the port preferably opens the tire valve. A check valve associated with the conduit prevents escape of pressure from the tire valve through the conduit. Subsequent attachment of the conduit to the container preferably opens a valve of the container, permitting the product to flow from the container into the tire through the conduit.

In another aspect of the invention, a system for dispensing a product into an inflation port of a tire is provided. The system includes a container and a conduit assembly. The container has the product pressurized therein, and a valve selectively permitting and preventing flow of the product from the container. The conduit assembly includes a flexible conduit extending between a container connector and a port connector, the container connector being configured for connection to the container for flow of the product from the container into the conduit, and the port connector being configured for connection to the inflation port for flow of the product from the conduit into the tire.

These and other features, advantages, benefits and objects of the present invention will become apparent to one of ordinary skill in the art upon careful consideration of the detailed description of a representative embodiment of the invention hereinbelow and the accompanying drawings.

DETAILED DESCRIPTION

Figure 1:
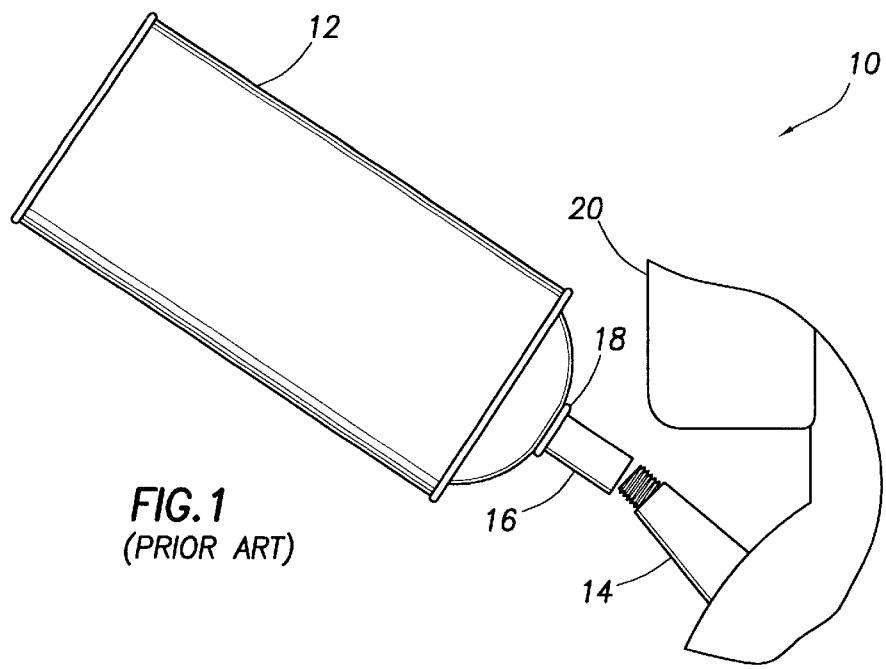
FIG. 1 is an elevational view of a prior art method of dispensing a tire sealant into a tire.

FIG. 1 illustrates a prior art method of dispensing a product from a container 12 into a tire inflation port or valve stem 14. The container 12 has a connector 16 rigidly attached thereto. A valve 18 of the container 12 prevents escape of the product from the container.

When it is desired to dispense the product from the container 12, the connector 16 is screwed onto the valve stem 14. As the connector 16 is threaded onto the valve stem 14, a valve (not shown) in the valve stem is opened and the valve 18 of the container 12 is opened, thereby permitting the product to flow from the container and into the tire.

Unfortunately, this method 10 is frequently inconvenient to use. Because the connector 16 is rigidly attached to the container 12, the container must be aligned with the valve stem 14 threads and must be rotated along with the connector. This is a relatively ungainly operation, which often results in the connector 16 being improperly threaded (e.g., cross-threaded) on the valve stem 14. As a result, a poor seal is frequently made between the connector 16 and valve stem 14, permitting the product to escape therebetween instead of flowing only into the tire. Another problem is that obstructions, such as a hub cap 20, may prevent the container 12 from being properly aligned with the valve stem 14, which in turn prevents the connector 16 from being properly threaded onto the valve stem.

Figure 2:
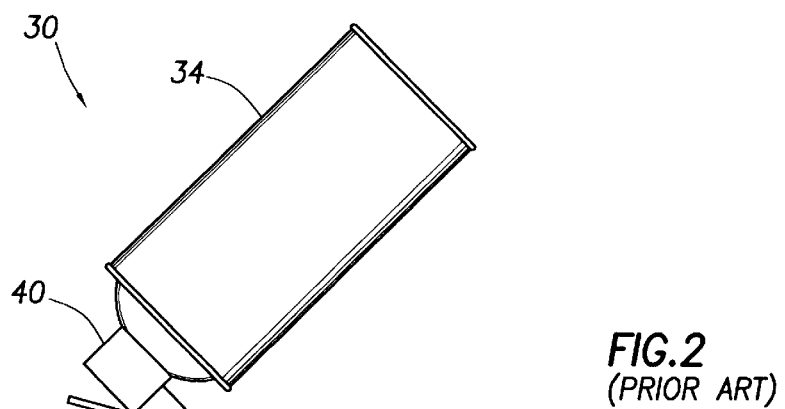
FIG. 2 is an elevational view of another prior art method of dispensing a tire sealant into a tire.
Figure 2:
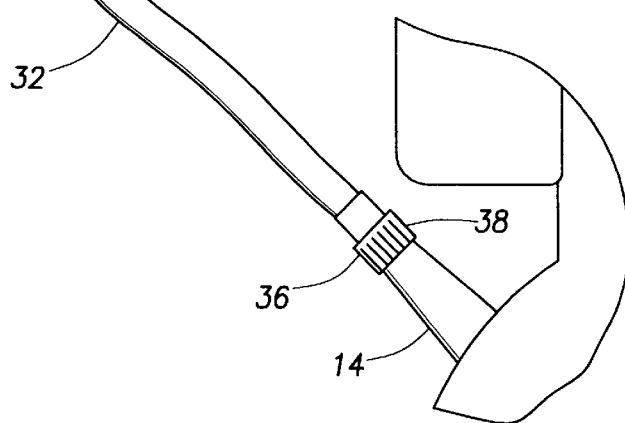

Another prior art method 30 is depicted in FIG. 2. This method 30 solves some of the problems with the method 10 discussed above, but substitutes others in their place. In the method 30, a flexible conduit 32 is interconnected between a container 34 and a valve stem connector 36. The conduit 32 spaces the container 34 away from any obstructions around the valve stem 14.

When it is desired to dispense the product from the container 34, the connector 36 is threaded onto the valve stem 14. The connector 36 has a nut 38 which rotates relative to the conduit 32, so that the conduit does not have to be rotated when the connector is threaded onto the valve stem 14. When the nut 38 has been sufficiently threaded onto the valve stem 14, the valve in the valve stem is opened, permitting flow between the conduit 32 and the tire. A valve 40 of the container 34 is then depressed to permit the product to flow from the container and into the tire through the conduit 32.

The main difficulties associated with this method 30 have to do with attaching the connector 36 to the valve stem 14. Since the container 34 is attached to the conduit 32 during this step, one hand must be used to hold the container, leaving only one other hand to thread the nut 38 onto the valve stem 14. In addition, since the nut 38 rotates relative to the conduit 32, a seal must be maintained between the rotating members. Another inconvenience is that the valve 40 must remain depressed (for example, by finger pressure) for the entire time that the product is being dispensed, and many people find this difficult.

Figure 3:
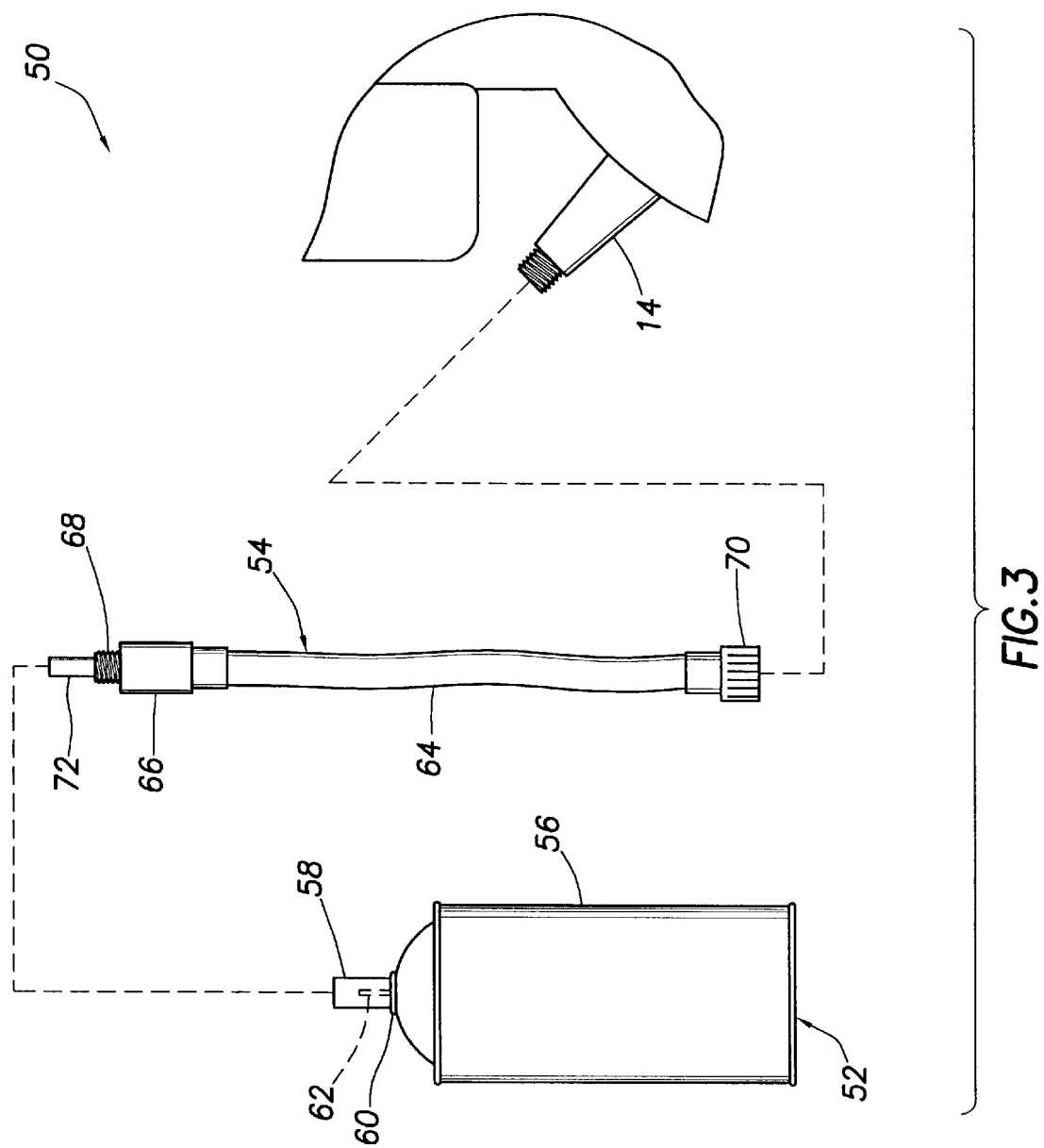
FIG. 3 is an elevational view of a system for dispensing a product into a tire, the system embodying principles of the present invention.

Representatively illustrated in FIG. 3 is a system 50 for dispensing a product into a tire, which system embodies principles of the present invention. In the following description of the system 50 and other apparatus and methods described herein, directional terms, such as "above", "below", "upper", "lower", etc., are used only for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention.

The system 50 solves the problems associated with prior art methods of dispensing a product into a tire, and does so in a straightforward, economical and convenient manner. The system 50 includes a container 52 and a conduit assembly 54. Note that the conduit assembly 54 is not initially attached to the container 52. This configuration substantially enhances the functionality and ease of use of the system 50, as will be described more fully below.

The container 52 is depicted in FIG. 3 as including a conventional can 56 of the type typically used for dispensing pressurized products, such as aerosol products. However, the container 52 has a specially configured connector 58 for attaching the conduit assembly 54 thereto. The container 52 also includes a conventional valve 60 with an upwardly projecting member 62. When the member 62 is depressed, the valve 60 opens and the product is permitted to flow out of the can 56. Note that other types of containers may be used in the system 50, without departing from the principles of the present invention.

The conduit assembly 54 includes a flexible conduit 64, a valve 66, a container connector 68 and an inflation port connector 70. The connector 68 is configured for attachment to the connector 58. As depicted in FIG. 3, the lo connector 68 is externally threaded and includes a projection 72 for depressing the member 62 when the connector 68 is threaded into the connector 58. However, it is to be clearly understood that the connectors 58, 68 could be otherwise configured and the valve 60 could be otherwise operated, without departing from the principles of the present invention. For example, the connectors 58, 68 could snap together, or could be clamped together, etc. The valve 60 could be opened by means other than depressing the member 62. For example, a ported sleeve could be displaced when the connectors 58, 68 are attached to each other, etc.

The inflation port connector 70 is in some respects similar to the connector 36 described above. That is, the connector 70 is threaded onto the valve stem 14, which opens the valve in the valve stem for flow between the conduit 64 and the tire. In the system 50, the connector 70 could be secured against rotation relative to the conduit 64 so a seal would not have to be maintained between the rotating members. However, the connector 70 preferably rotates relative to the conduit 64 in the system 50. Furthermore, other types of connectors may be used in place of the connector 70, for example, a clamp connector, etc.

The connector 70 does not need to rotate relative to the conduit 64, because the conduit assembly 54 is attached to the valve stem 14 without the container 52 being attached to the conduit assembly, as is described in more detail below. Thus, there is no need to provide a rotating seal in the connector 70. In addition, both of a person's hands may be used to attach the conduit assembly 54 to the valve stem 14, since one of the hands is not occupied with holding the container 52.

The valve 66 prevents escape of pressure from the conduit assembly 54 when the connector 70 is attached to the valve stem 14. There may be some pressure remaining in the tire when the product is to be dispensed into the tire. It is preferable not to let the pressure escape from the conduit assembly 54 when it is attached to the valve stem 14. The valve 66 acts to close off the conduit assembly 54 so that, when the connector 70 is attached to the valve stem 14, opening the valve therein, any pressure in the tire does not escape from the conduit assembly.

Figure 4:
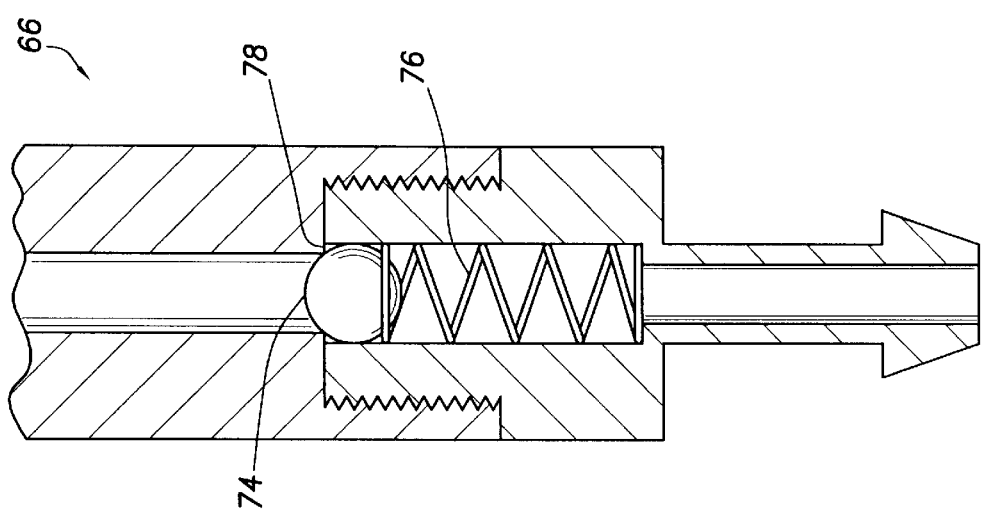
FIG. 4 is a cross-sectional view of a check valve of the system of FIG. 3.

Preferably, the valve 66 is a check valve. Referring additionally now to FIG. 4, a cross-sectional view of the valve 66 is representatively illustrated. The valve includes a ball 74 and a spring 76 biasing the ball against a seat 78. Note that other types of check valves may be used for the valve 66 in keeping with the principles of the invention. Furthermore, the valve 66 could be another type of valve. For example, the valve 66 could be a valve which is opened by displacing a member, such as the projection 72, when the connectors 58, 68 are attached to each other.

When the conduit assembly 54 is attached to the container 52, pressure in the container exceeds pressure in the conduit assembly. This pressure differential opens the valve 66, permitting the product to flow from the container 52 and into the conduit assembly 54. Note that the product flows continuously from the container 52 as long as the conduit assembly 54 is attached to the container, thereby eliminating the need to depress a valve (such as the valve 40 described above) with finger pressure for the entire duration of dispensing product from the container.

Figure 5:
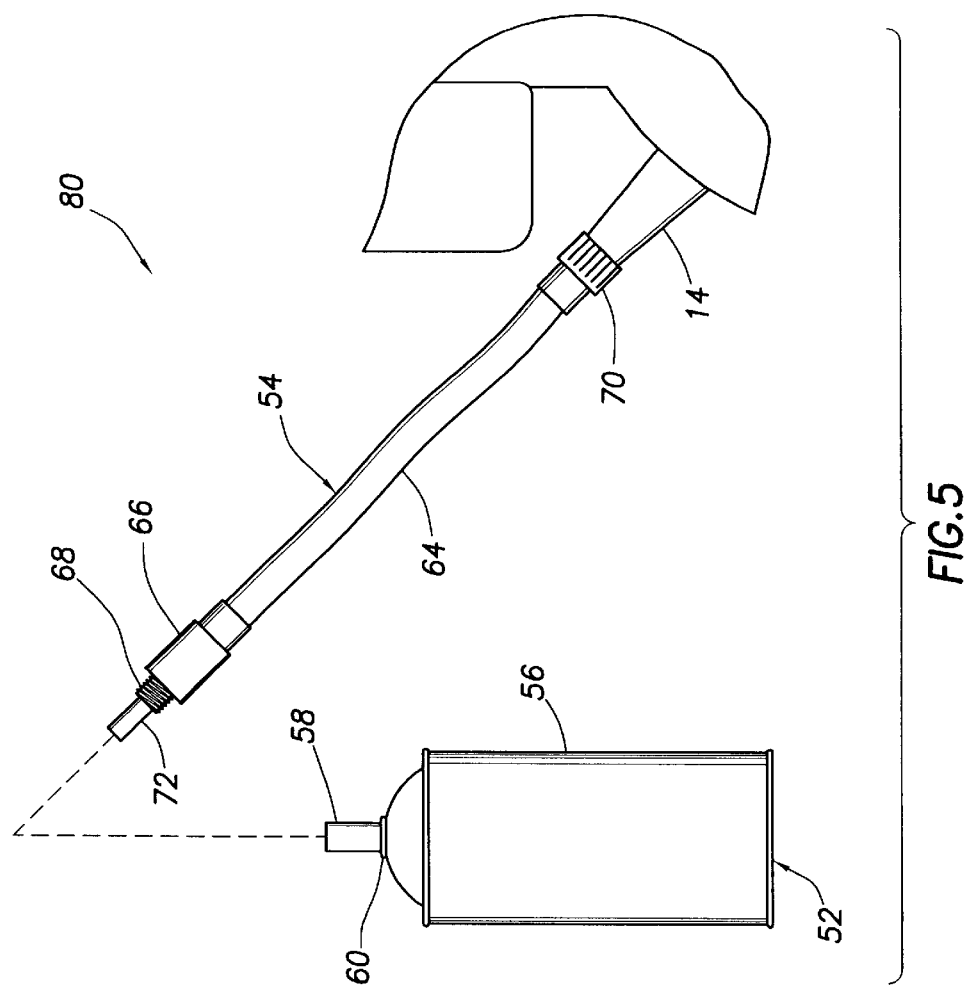
FIGS. 5 & 6 are elevational views of successive steps of a method of dispensing a product into a tire, the method embodying principles of the present invention.
Figure 6:
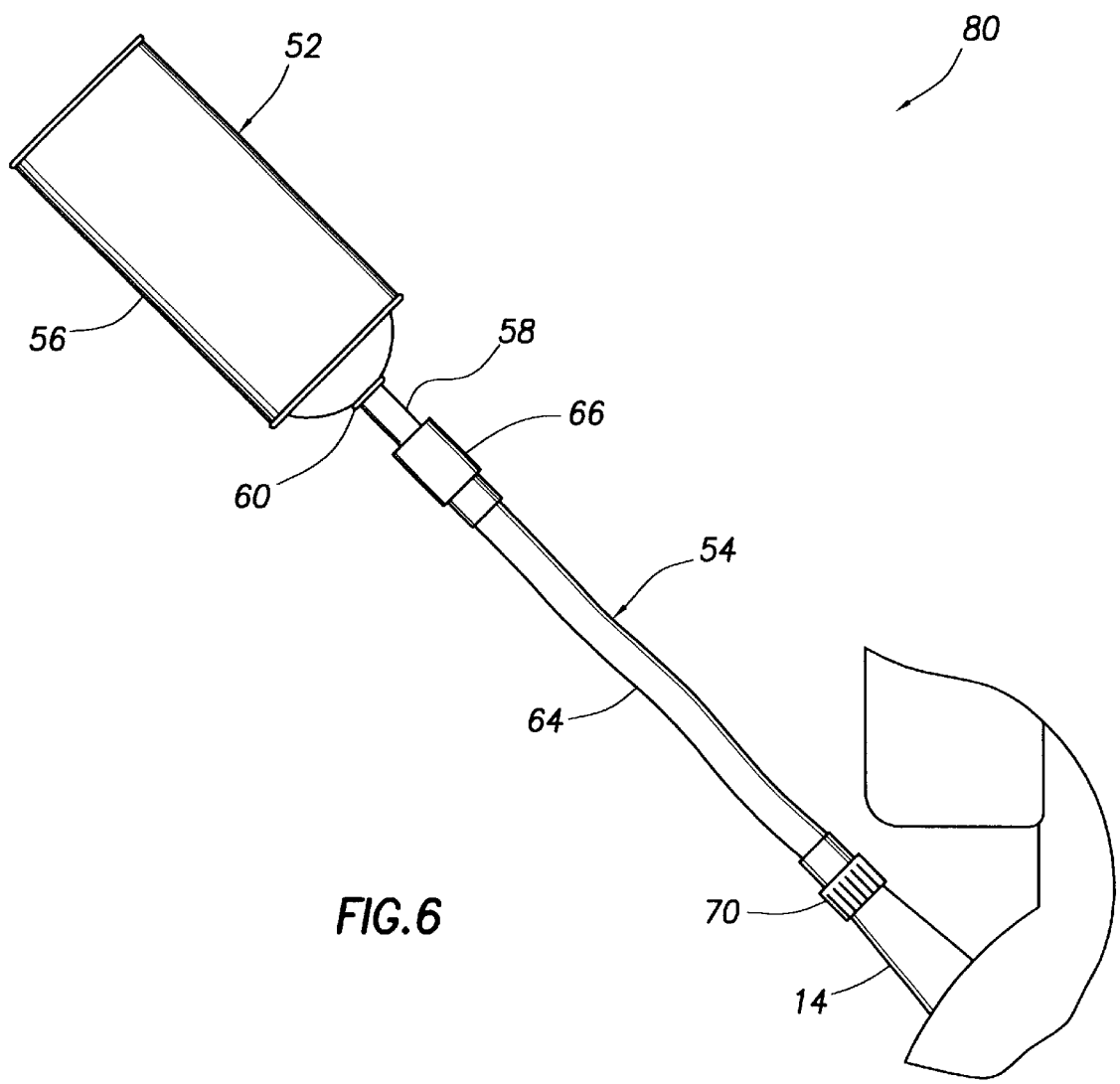

Referring additionally now to FIGS. 5 & 6, a method 80 of dispensing the product from the container 52 into the tire is representatively illustrated, the method embodying principles of the present invention. In the method 80, the conduit assembly 54 is attached to the valve stem 14 prior to attaching the container 52 to the conduit assembly, as depicted in FIG. 5.

This step may be conveniently and easily performed, thereby lessening the probability that the connector 70 will be improperly or incompletely threaded onto the valve stem 14. There is no need to hold the container 52 during this step, and the flexible conduit assembly 54 can easily avoid any obstacles.

Although the attachment of the connector 70 to the valve stem 14 permits flow between the conduit assembly 54 and the valve stem, any remaining pressure in the tire is prevented from escaping by the valve 66. Note that the valve 66 could be provided at either end of the conduit 64 to prevent flow from the tire through the conduit.

As depicted in FIG. 6, the container 52 is attached to the conduit assembly 54 after the conduit assembly is attached to the valve stem 14. When the connectors 58, 68 are attached to each other, the valve 60 is opened and the valve 66 permits the product to flow from the container 52 through the conduit assembly 54 and into the tire. As long as the connectors 58, 68 are attached to each other, the valve 60 is open, without the need of depressing the valve by finger pressure, etc.

To cease dispensing the product from the container 52, the connectors 58, 68 are detached from each other. This closes the valve 60 and then releases the container 52 from the conduit assembly 54. The valve 66 prevents the product remaining in the conduit assembly 54 from escaping when the container 52 is detached from the conduit assembly.

The conduit assembly 54 is then detached from the valve stem 14. The valve in the valve stem 14 closes when the connector 70 is detached therefrom.

Note that any type of product may be dispensed into a tire using systems and methods embodying principles of the present invention. Tire sealers, inflators, balancers, etc. are but examples of products which may be dispensed into a tire.

In addition, the principles of the present invention may be used in conjunction with tubeless and tube type tires. For example, the phrase "into a tire" as used herein may be taken to mean "into a tire tube", and the tire valve stem 14 may be a valve of a tube in a tire, etc.

Of course, a person skilled in the art would, upon a careful consideration of the above description of representative embodiments of the invention, readily appreciate that many modifications, additions, substitutions, deletions, and other changes may be made to these specific embodiments, and such changes are contemplated by the principles of the present invention. Accordingly, the foregoing detailed description is to be clearly understood as being given by way of illustration and example only, the spirit and scope of the present invention being limited solely by the appended claims and their equivalents.

What is claimed is:

1. A method of dispensing a liquid tire treatment product into a tire having an inflation port associated therewith for inflation of the tire, the method comprising the steps of:

attaching a flexible conduit to the inflation port;

then operatively attaching the conduit to a container of the product; and then flowing the product from the container into the inflation port through the conduit, the conduit being free of the product therein prior to the flowing step.

2. The method according to claim 1, wherein the step of attaching the conduit to the port further comprises preventing escape of pressure from the port through the conduit.

3. The method according to claim 2, wherein in the preventing step, a check valve associated with the conduit prevents escape of pressure from the port through the conduit.

4. The method according to claim 1, further comprising the step of dispensing the product from the container, through the conduit and into the port.

5. The method according to claim 4, wherein the dispensing step is performed automatically in response to the step of attaching the conduit to the container.

6. The method according to claim 4, wherein in the step of attaching the conduit to the container a positive pressure differential exists from the container to the tire, the pressure differential opening a valve to permit flow of the product from the container to the port in response to the step of attaching the conduit to the container.

7. The method according to claim 6, wherein in the opening step, the valve is a check valve permitting flow from the container to the port, but preventing flow from the port to the container.

8. The method according to claim 4, further comprising the step of opening a valve, to thereby permit flow from the container to the port, in response to the step of attaching the conduit to the container.

9. The method according to claim 1, wherein in the step of attaching the conduit to the port, a port connector attached to the conduit is secured against rotation relative to the conduit.

10. The method according to claim 1, wherein in the step of attaching the conduit to the port, the conduit is part of an assembly which further includes a port connector and a valve, the port connector securing the conduit to the port and providing for flow therebetween, and the valve preventing pressure from escaping from the conduit.

11. The method according to claim 10, wherein in the preventing step, the valve is a check valve, the check valve opening in response to the step of attaching the conduit to the container.

12. A system for dispensing a liquid tire treatment product into an inflation port of a tire, the system comprising:

a container having the product pressurized therein, and a first valve selectively permitting and preventing flow of the product from the container; and a conduit assembly including a flexible conduit extending between a container connector and a port connector, the container connector being configured for connection to the container for flow of the product from the container into the conduit, and the port connector being configured for connection to the inflation port for flow of the product from the conduit into the tire, the conduit being free of the product therein until the first valve permits flow of the product from the container.

13. The system according to claim 12, wherein the conduit assembly further includes a second valve preventing release of pressure from the conduit assembly when the port connector is connected to the inflation port.

14. The system according to claim 13, wherein the second valve is a check valve.

15. The system according to claim 13, wherein the second valve permits the product to flow from the container into the conduit when the container connector is operably connected to the container after the port connector is operably connected to the inflation port.

16. The system according to claim 12, wherein the container connector is further configured to open the first valve when the container connector is operably connected to the container.

\* \* \* \* \*